Aug. 30, 1949.  H. N. PARSONS  2,480,258
METHOD OF MAKING BALL BEARING RETAINERS
Filed Nov. 18, 1946
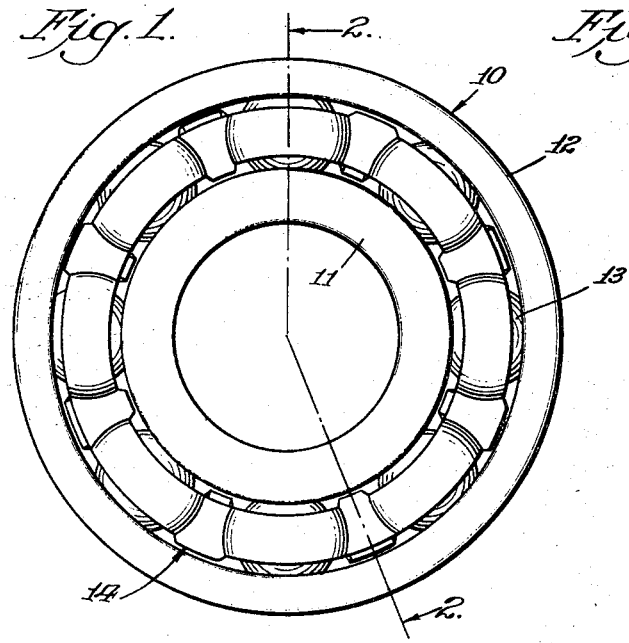
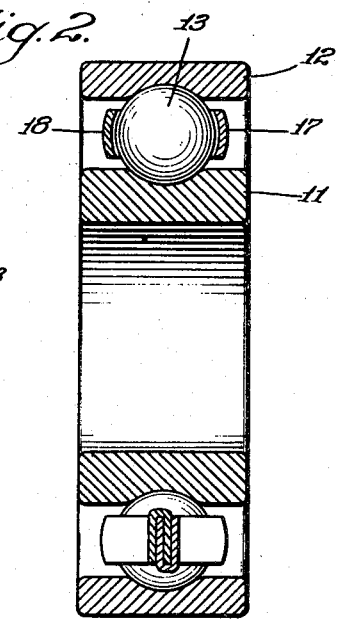
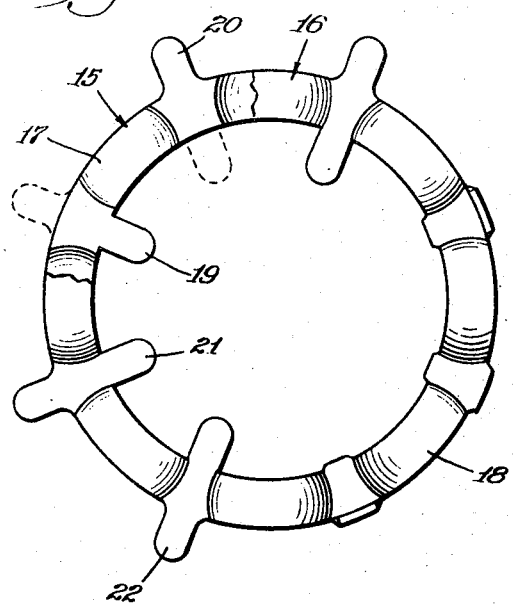
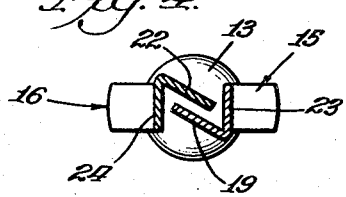
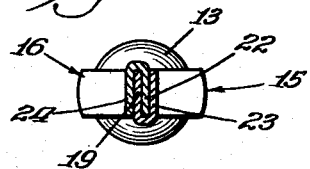
Inventor:
Harry N. Parsons
By Paul O. Pippel
Atty Patented Aug. 30, 1949

2,480,258

UNITED STATES PATENT OFFICE 2,480,258

METHOD OF MAKING BALL BEARING RETAINERS

Harry N. Parsons, Chicago, Ill., assignor to International Harvester Company, a corporation of New Jersey Application November 18, 1946, Serial No. 710,446

1 Claim. (Cl. 113—117)

This invention relates to a new and improved method of making a ball bearing retainer and has for one of its principal objects the provision of a method for assembling a pair of preformed rings.

An important object of this invention is to provide a method of making a ball bearing retainer composed of a pair of identical rings.

Another object of this invention is to provide a method for clinching together a pair of identical rings in such a manner as to form a complete ball bearing retainer having a plurality of clinched portions at spaced intervals around the periphery thereof, and further to provide clinching members on each ring which will alternately bend under and then over the adjacent ring.

Still another object of this invention is the provision of a ball bearing retainer composed of two opposed rings wherein the rings are clinched together between their abutting surfaces.

Another and still further object of this invention is to provide a method of constructing a ball bearing retainer in which a pair of rings are clinched together by inwardly projecting tangs.

Still another object of this invention is to provide a ball bearing retainer which is substantially tamper proof without employing welds, rivets, or the like.

Other and further important objects of this invention will become apparent from the disclosures in the following specification and accompanying drawings, in which:

Figure 1 is a top plan view of a ball bearing employing the retainer of this invention;

Figure 2 is a sectional view taken on the line 2—2 of Figure 1;

Figure 3 shows a plan view detail of the retainer in the bearing of Figure 1 with portions broken away and portions thereof not clinched;

Figure 4 is a cross-sectional view of the ball retainer as it is being assembled in the bearing; and Figure 5 is a view similar to Figure 4 showing the retainer fully clinched together.

As shown in the drawings:

The reference numeral 10 indicates generally a ball bearing having an inner annular bearing race 11 and an outer annular race 12. A plurality of balls 13 are positioned between the inner and outer races and maintain the races in fixed spaced apart position. There are several types of ball bearings. Certain bearings employ sufficient balls so that they substantially contact each other, forming a complete ring of balls. In that type of bearing there is no need for any means to maintain the balls spaced apart because the balls themselves cannot come closer together than the succeeding ball. However, in the bearing as shown in the present invention there are a lesser number of balls employed so that they will not extend around a full annular path provided between the races. In such a bearing a ball spacing device is very necessary. Without this spacing device the bearing would undoubtedly collapse on one side.

A ball spacing device or a ball retainer, as it is commonly known, is shown at 14. The retainer 14 consists of opposed identical rings 15 and 16. Each of the rings 15 and 16 is provided with ball engaging portions. On the ring 15 these are shown at 17 and on the ring 16 they are shown at 18. The portions 17 and 18 are semicircular in shape and are adapted to snugly engage the ball members 13. These portions 17 and 18 in addition to being semicircular in shape are curved in the opposite plane as shown in Figure 2 in order to conform to the spherical surface of the ball. The ring 15 is equipped with alternately inwardly and outwardly extending tangs or fingers 19 and 20 respectively. The other ring 16 is provided with similar inwardly and outwardly projecting clinching fingers 21 and 22 respectively, spaced alternately around the periphery of the ring.

As best shown in Figure 4, the clinching fingers are partially bent so that each finger forms an acute angle with its ring and the ends of the fingers are positioned on a level approximately that of the center of their ring so that, upon bringing the two rings 15 and 16 together and in alinement, the finger 22 on the ring 16 will be in a position between the acute angular space defined by the finger 19 of the ring 15 and the main body portion of the ring 15 as indicated by the numeral 23. Similarly the finger 19 lies in a position within the angle formed by the finger 22 and the main body portion of the ring 16 as indicated by the numeral 24. The rings 15 and 16 are placed together so that the alternate outwardly and inwardly extending fingers engage an oppositely extending finger on the opposed ring. The rings, of course, are identical but they are turned with respect to each other to accomplish the engaging of oppositely extending tangs or fingers.

The rings 15 and 16 are placed between the inner and outer races 11 and 12 so that each of the portions 17 and 18 encircles the ball 13. In this position the fingers overlap, as shown in Figure 4, by the fingers 19 and 22. Direct and opposite force is exerted on the outside of both rings 15 and 16 inwardly toward each other. This causes the tangs to slide up within the acute angles and become clinched, such as shown in Figure 5, wherein the fingers 19 and 22 are closely clinched together between the outer main body portions 23 and 24 of the rings 15 and 16 respectively. The clinched rings 15 and 16 are now held together as a unit and form a complete ball bearing retainer. The clinching of the fingers intermediate the abutment of the rings prevents undesirable tampering therewith. The rings cannot be separated by prying the fingers apart, inasmuch as the fingers are sealed between the main body portions of the rings 23 and 24. The method of assembling the component ring parts of the retainer is quite novel. Two identical rings having alternately and oppositely extending radial fingers are provided. The fingers are partially bent so that upon placing the rings together the inwardly partially bent fingers overlap. Force is then applied inwardly against the outside of both rings so that the inwardly partially bent fingers are completely collapsed upon one another and are clinched to each other. This novel method of construction eliminates the usual fastening methods such as welding or riveting which are commonly employed.

Numerous details of construction may be varied throughout a wide range without departing from the principles disclosed herein, and I therefore do not propose limiting the patent granted hereon otherwise than as necessitated by the appended claim.

What is claimed is:

A method of making a ball bearing retainer including the steps of forming identical rings having complementary spaced pocket portions and radial fingers projecting alternately inwardly and outwardly therefrom in the spaces around the ring between the pocket portions, partially bending the inwardly projecting fingers upwardly partially bending the outwardly projecting fingers downwardly forming an acute angle with their ring and the ends of the bent fingers positioned approximately on a level with the center of their ring, placing the rings in a position opposing and in alinement with each other and in such a manner that an outwardly projecting finger is in alinement with an inwardly projecting finger, each of said partially bent fingers adapted to be disposed in the acute angle formed by the alined and opposed partially bent fingers, and applying direct and opposite forces against the rings causing the partially bent fingers to clinch together inwardly of the opposed rings and within the acute angles.

HARRY N. PARSONS.

REFERENCES CITED

The following references are of record in the file of this patent:

UNITED STATES PATENTS

| Number | Name | Date |
|---|---|---|
| 1,176,133 | Czech | May 21, 1916 |
| 1,463,299 | Staake | July 31, 1923 |
| 1,681,880 | Schneible | Aug. 21, 1938 |
| 1,796,015 | Francis et al. | Mar. 10, 1931 |
| 2,078,456 | Pew | Apr. 27, 1937 |
| 2,112,299 | Annen | Mar. 29, 1938 |

FOREIGN PATENTS

| Number | Country | Date |
|---|---|---|
| 150,324 | Great Britain | Aug. 20, 1920 |
| 492,920 | Germany | Feb. 28, 1930 |